(12) United States Patent
Eihusen et al.

(10) Patent No.: US 9,618,160 B2
(45) Date of Patent: Apr. 11, 2017

(54) PRESSURE VESSEL LONGITUDINAL VENTS

(75) Inventors: John A. Eihusen, Lincoln, NE (US);
Norman Lynn Newhouse, Lincoln, NE (US); Nicholas Noel Kleinschmit, Fordyce, NE (US)

(73) Assignee: HEXAGON TECHNOLOGY AS, Alesund (NO)

(*) Notice: Subject to any disclaimer, the term of this patent is extended or adjusted under 35 U.S.C. 154(b) by 893 days.

(21) Appl. No.: 13/147,624

(22) PCT Filed: Feb. 3, 2010

(86) PCT No.: PCT/US2010/023010
§ 371 (c)(1),
(2), (4) Date: Oct. 24, 2011

(87) PCT Pub. No.: WO2010/091062
PCT Pub. Date: Aug. 12, 2010

(65) Prior Publication Data
US 2012/0048865 A1    Mar. 1, 2012

Related U.S. Application Data

(60) Provisional application No. 61/150,366, filed on Feb. 6, 2009.

(51) Int. Cl.
*F17C 1/00* (2006.01)
*F17C 13/00* (2006.01)

(52) U.S. Cl.
CPC .... *F17C 13/002* (2013.01); *F17C 2201/0109* (2013.01); *F17C 2201/0119* (2013.01);
(Continued)

(58) Field of Classification Search
CPC .......... F17C 2201/01; F17C 1/00; F17C 1/02; F17C 1/10; F17C 2203/00; F17C 2203/06
(Continued)

(56) References Cited

U.S. PATENT DOCUMENTS 1,651,521 A    12/1927   Girardville
2,243,240 A    5/1941    Zerbe
(Continued)

FOREIGN PATENT DOCUMENTS

RU    2117853    8/1998
RU    2162564    1/2001
(Continued)

OTHER PUBLICATIONS

Communication from European Patent Office regarding European Patent Application No. 10704629.4, dated Aug. 18, 2011 (2 pages).
(Continued)

*Primary Examiner* — Steven A. Reynolds
*Assistant Examiner* — Javier A Pagan
(74) *Attorney, Agent, or Firm* — Mai-Tram D. Lauer; Westman Champlin & Koehler, P.A.

(57) ABSTRACT

The disclosure describes a pressure vessel having a first end with a first boss and a cylindrical portion. The vessel includes a liner, a composite shell disposed over the liner, and a first longitudinal vent disposed between the liner and the composite shell. The first longitudinal vent includes an elongated vent defining element and extends at least from the cylindrical portion of the vessel to the first boss.

11 Claims, 4 Drawing Sheets

(52) U.S. Cl.
CPC ..... *F17C 2201/056* (2013.01); *F17C 2203/0604* (2013.01); *F17C 2203/0621* (2013.01); *F17C 2203/0624* (2013.01); *F17C 2203/0663* (2013.01); *F17C 2205/0305* (2013.01); *F17C 2209/2154* (2013.01); *F17C 2221/011* (2013.01); *F17C 2221/012* (2013.01); *F17C 2221/014* (2013.01); *F17C 2221/033* (2013.01); *F17C 2221/035* (2013.01); *F17C 2223/0123* (2013.01); *F17C 2223/036* (2013.01); *F17C 2227/044* (2013.01); *F17C 2260/011* (2013.01); *F17C 2260/037* (2013.01); *F17C 2260/04* (2013.01); *Y02E 60/321* (2013.01)

(58) Field of Classification Search
USPC ..... 220/89.1, 586, 587, 591, 745, 913, 4.12, 220/62.11, 62.21, 62.22, 581, 588
See application file for complete search history.

(56) References Cited

U.S. PATENT DOCUMENTS

| | | | |
|---|---|---|---|
| 2,344,856 | A | 3/1944 | Earle |
| 3,224,619 | A | 12/1965 | Maurin |
| 3,231,338 | A | 1/1966 | Andrus |
| 3,488,160 | A | 1/1970 | Noel |
| 3,604,587 | A | 9/1971 | Pechacek |
| 3,785,040 | A * | 1/1974 | Pechacek ..................... 29/447 |
| 4,107,372 | A * | 8/1978 | Clausen et al. ............... 442/53 |
| 4,241,843 | A * | 12/1980 | Walker et al. ............. 220/4.12 |
| 4,298,416 | A | 11/1981 | Casson |
| 5,476,189 | A * | 12/1995 | Duvall et al. ............... 220/590 |
| 5,901,379 | A * | 5/1999 | Hirata ............................. 2/170 |
| 6,648,167 | B1 * | 11/2003 | Brupbacher et al. ......... 220/586 |
| 7,287,663 | B2 * | 10/2007 | Vandal et al. ................ 220/586 |
| 7,870,971 | B2 * | 1/2011 | Schlag ........................... 220/585 |
| 2009/0057319 | A1 * | 3/2009 | Schlag ........................... 220/586 |

FOREIGN PATENT DOCUMENTS

| | | |
|---|---|---|
| RU | 2187746 C2 | 8/2002 |
| WO | 00-08368 | 2/2000 |
| WO | 02-46654 | 6/2002 |

OTHER PUBLICATIONS

Reply to European Patent Office communication regarding European Patent Application No. 10704629.4, dated Jan. 25, 2012 (10 pages).
Communication from European Patent Office regarding European Patent Application No. 10704629.4, dated May 18, 2012 (1 page).
Reply to European Patent Office communication regarding European Patent Application No. 10704629.4, dated Oct. 8, 2012 (9 pages).
International Search Report from corresponding PCT Application No. PCT/US2010/023010, 2 pages (Mar. 30, 2010).
Written Opinion of the International Searching Authority from corresponding PCT Application No. PCT/US2010/023010, 4 pages (Mar. 30, 2010).
English translation of the first Official Action in corresponding Russian Patent Application No. 2011136814, dated Apr. 19, 2013 (7 pages).
Russian Decision on Grant dated Sep. 24, 2013 for corresponding Russian Application No. 2011136814/06 (054755), filed Feb. 3, 2010 (3 pages).
Patent Examination Report dated Dec. 22, 2015, for corresponding Canadian Application No. 2,751,453, filed Feb. 3, 2010.
Examiner's Report in corresponding Canadian Patent Application No. 2,751,453 dated Aug. 11, 2016.
Patent Examination Report dated Mar. 23, 2015 for corresponding Australian Application No. 2010210738, filed Feb. 3, 2010.

* cited by examiner

PRESSURE VESSEL LONGITUDINAL VENTS

CROSS-REFERENCE TO RELATED APPLICATION

This application is a Section 371 National Stage Application of International Application No. PCT/US2010/023010, filed Feb. 3, 2010 and published as WO/2010/091062 on Aug. 12, 2010, in English, the contents of which are hereby incorporated by reference in their entirety

BACKGROUND

Pressure vessels are commonly used for containing a variety of fluids under pressure, such as storing hydrogen, oxygen, natural gas, nitrogen, propane and other fuels, for example. Suitable container materials include laminated layers of wound fiberglass filaments or other synthetic filaments bonded together by a thermal-setting or thermoplastic resin. A polymeric or other non-metal resilient liner or bladder often is disposed within the composite shell to seal the vessel and prevent internal fluids from contacting the composite material. The composite construction of the vessels provides numerous advantages such as lightness in weight and resistance to corrosion, fatigue and catastrophic failure. These attributes are due to the high specific strengths of the reinforcing fibers or filaments that are typically oriented in the direction of the principal forces in the construction of the pressure vessels.

FIGS. 1 and 2 illustrate an elongated pressure vessel 10, such as that disclosed in U.S. Pat. No. 5,476,189, which is hereby incorporated by reference. Vessel 10 has a main body section 12 with end sections 14. A boss 16, typically constructed of aluminum, is provided at one or both ends of the vessel 10 to provide a port for communicating with the interior of the vessel 10. The vessel 10 is formed from an inner polymer liner 20 covered by an outer composite shell 18. In this case, "composite" means a fiber reinforced resin matrix material, such as a filament wound or laminated structure. The composite shell 18 resolves all structural loads.

Although the liner 20 provides a gas barrier under typical operating conditions, the design of a pressure vessel 10 of this type produces a phenomenon wherein gas diffuses into the liner 20 under pressurization. When depressurization of the vessel 10 occurs, this gas diffuses into the space between the liner 20 and the composite shell 18. A pocket of gas may thereby be formed, forcing the liner 20 to bulge inward. At low pressure, laminate strain in the composite shell 18 is low, and microcracks in the shell 18 close up, forming a seal; when a higher pressure is reached, those microcracks open up again, thereby allowing expulsion of the trapped pocket of gas. Thus, when the vessel 10 is re-pressurized, pressure builds up against liner 20, pushing against the trapped gas pocket, making the bulge in the liner 20 smaller until the gas is ultimately expelled through the composite shell 18 to the atmosphere. Such expulsion of gas through shell 18 may occur in a short time interval and can cause a significant concentration of gas to become present in the surroundings of the vessel 10. This may set off a leak detector around the vessel 10, when actually there is no steady leak from the vessel 10.

SUMMARY

This disclosure describes a pressure vessel having a center and a first end. The first end has a first boss. The vessel comprises a liner, a composite shell disposed over the liner, and a first longitudinal vent disposed between the liner and the composite shell. The first longitudinal vent comprises an elongated vent defining element and extends at least from the cylindrical portion of the vessel to the first boss.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The figures may not be drawn to scale. In particular, some feature may be enlarged relative to other features for clarity. Moreover, where terms such as above, below, over, under, top, bottom, side, right, left, etc., are used, it is to be understood that they are used only for ease of understanding the description. It is contemplated that structures may be otherwise oriented.

DETAILED DESCRIPTION

Figure 1:
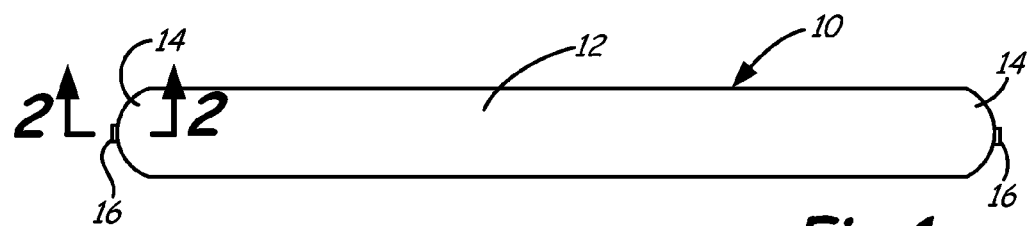
FIG. 1 is a side elevation view of a typical elongated pressure vessel.
Figure 2:
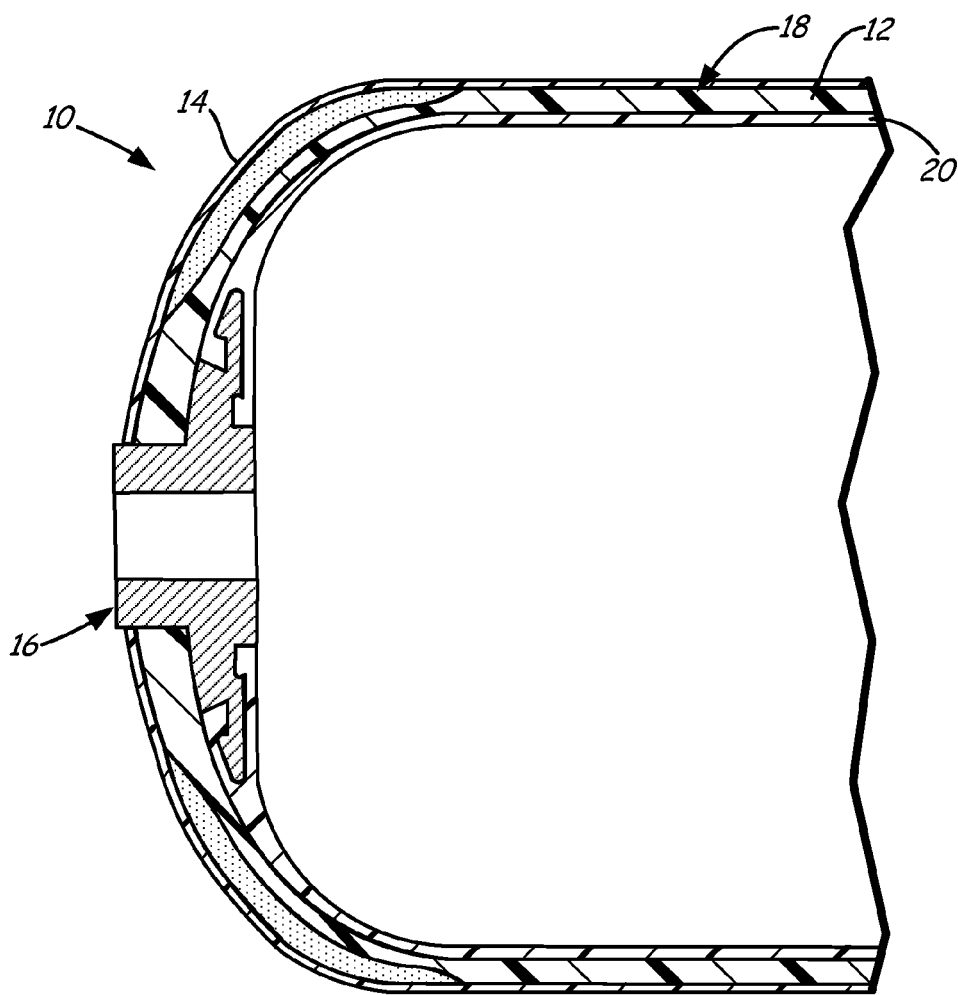
FIG. 2 is a partial cross-sectional view through one end of such a pressure vessel, taken along line 2-2 of FIG. 1.
Figure 3:
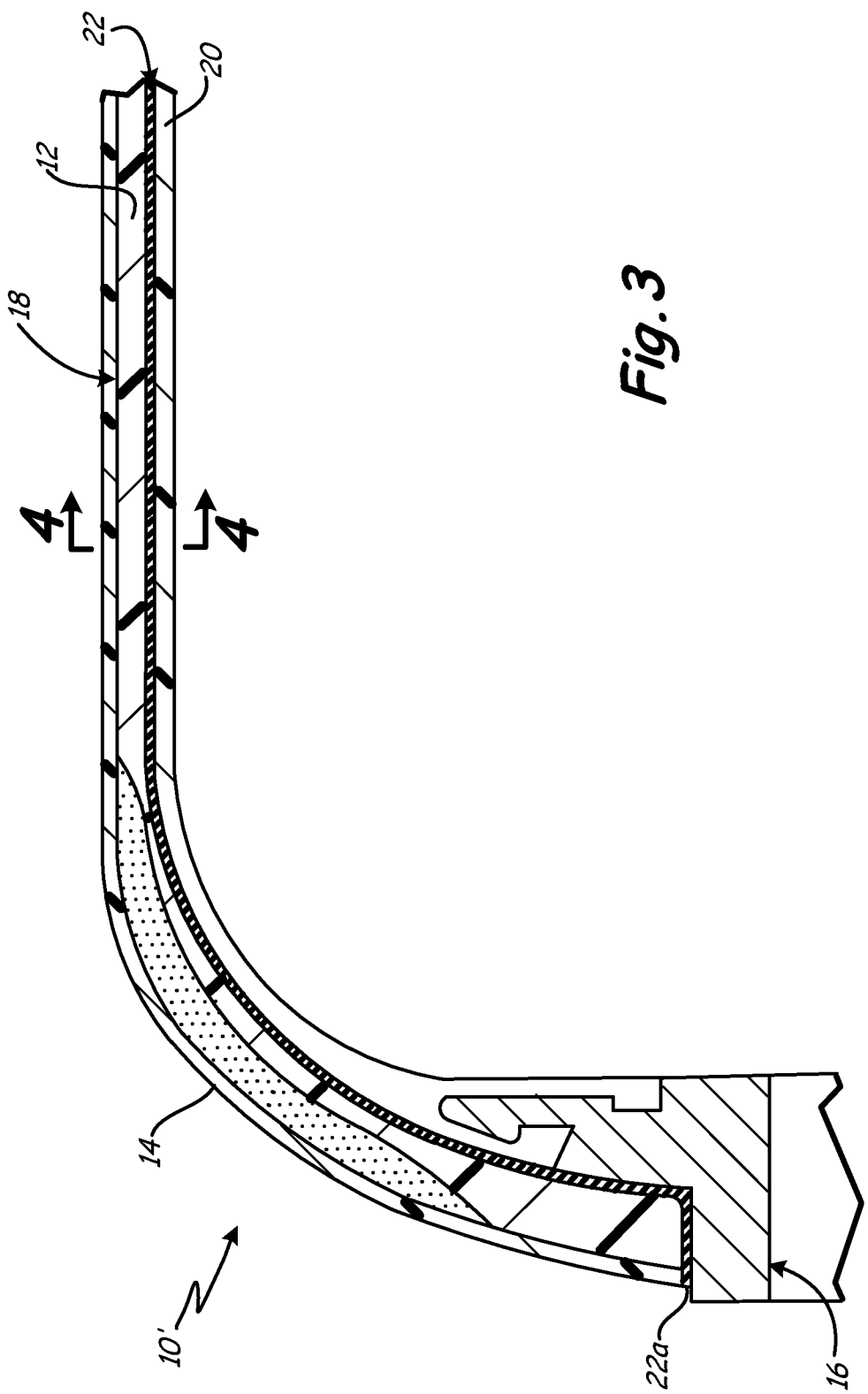
FIG. 3 is an enlarged partial cross-sectional view of a pressure vessel incorporating an exemplary embodiment of a longitudinal vent of the present disclosure.

This disclosure relates to providing a vent path to prevent gas and pressure build up between the liner 20 and the composite 18 of a pressure vessel 10'. This vent path allows gas, such as hydrogen, to escape at a steadier rate, preventing leak detector disturbances, as well as preventing the liner 20 from bulging or buckling inwardly. Exemplary embodiments of such a vent path are provided as longitudinal vents 22, 22' and 22" of FIGS. 3-7. As shown in FIG. 3, an end 22*a* of longitudinal vent 22 adjacent boss 16 is open to the atmosphere.

Figure 4:
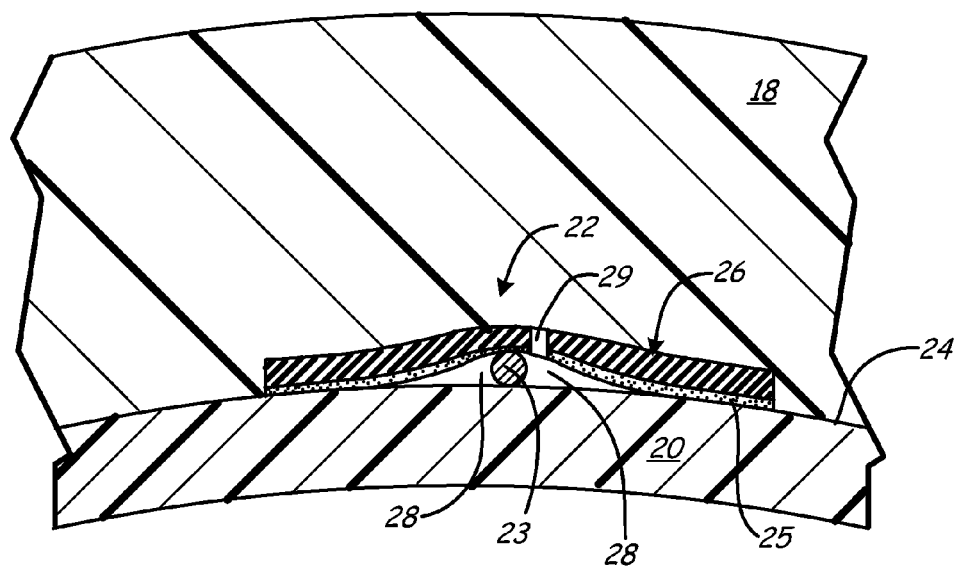
FIG. 4 is a partial cross-sectional view, taken along line 4-4 of FIG. 3, of a first exemplary longitudinal vent positioned between the vessel shell and liner.
Figure 5:
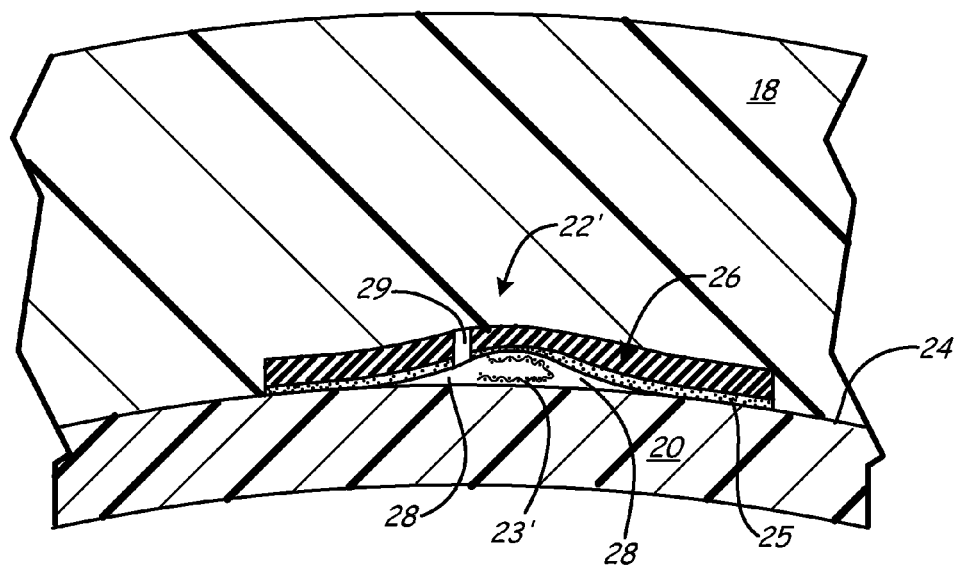
FIG. 5 is a partial cross-sectional view, taken along line 4-4 of FIG. 3, of a second exemplary longitudinal vent positioned between the vessel shell and liner.
Figure 6:
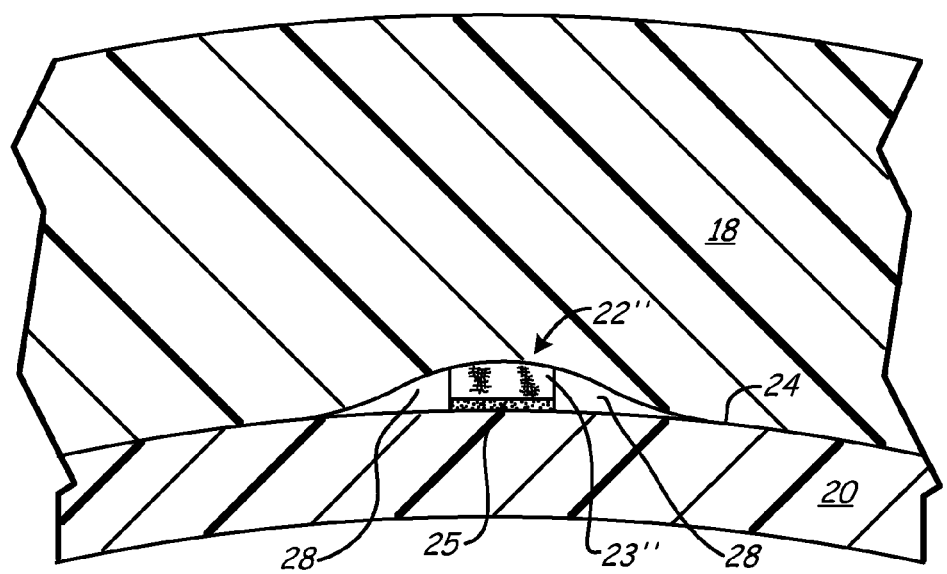
FIG. 6 is a partial cross-sectional view, taken along line 4-4 of FIG. 3, of a third exemplary longitudinal vent positioned between the vessel shell and liner.

In forming vessel 10', prior to winding the fibers of the composite material around the liner 20, at least one strip of a vent defining element 23, 23', 23" is applied to an exterior surface 24 of the liner 20. As shown in the embodiments of FIGS. 4 and 5, an elongated vent defining element 23 (such as, for example a wire), 23' (such as, for example a folded strip of textile or of film) is held in place by covering tape 26 via adhesive layer 25. As shown in the embodiment of FIG. 6, vent defining element 23" is self-adhesive and held in place by adhesive layer 25. In the embodiment shown in FIG. 5, where vent defining element 23' may be a textile that has "wicking" properties (such as, for example, a glass cloth material), the covering tape 26 prevents resin infusion from composite shell 18 that would otherwise clog the porous characteristics of vent defining element 23'. If the venting material is not porous, the tape material may be applied at discrete points rather than continuously over the venting material. A particularly suitable covering tape material is vinyl. With the vent defining elements 23, 23' and 23" secured to the exterior surface 24 of liner 20, composite fibers are then wound over the longitudinal vents 22, 22', 22" as the composite shell 18 for the vessel 10' is formed over liner 20.

As illustrated in FIGS. 4-6, on each side of the vent defining element 23, 23', 23", a vent channel 28 is formed. Vent defining element 23, 23', 23" may be any elongated structure over which composite fibers may be wound to produce shell 18 such that a vent channel is formed between the shell 18 and the liner 20. In the illustrated embodiments, elongated vent channels 28 are formed on each side of vent defining element 23, 23', 23". In some embodiments, a vent channel is formed within the vent defining element 23, 23', 23" itself. This is possible when the vent defining element 23, 23', 23" is fluid-permeable or is otherwise formed to facilitate fluid flow along the elongated structure of the vent defining element. In some cases, a fluid permeable vent defining element 23, 23', 23" is used in conjunction with vent channels 28 formed on each side of the fluid-permeable vent defining element 23, 23', 23". This offers even more venting capacity for each longitudinal vent 22. Exemplary fluid permeable vent defining elements 23, 23', 23" include, for example, fiber glass strands, open weave fiber glass tape, and textiles. Other suitable materials for vent defining element 23, 23', 23" include, for example, polyethylene and nylon release cloth.

In an exemplary embodiment, a total thickness of the longitudinal vent 22 on top of the liner 20 is about 1-2 thousandths of an inch. In some embodiments, a strip of vent defining element 23, 23', 23" is folded to accomplish a suitable depth to facilitate gas flow through the longitudinal vent 22, as shown in FIG. 5. In an exemplary embodiment, a width of each longitudinal vent 22 is about 0.25 to 0.50 inch. In an exemplary embodiment, a plurality of holes 29 are provided in covering tape 26 to facilitate the migration of gas trapped between composite shell 18 and liner 20 into longitudinal vent 22. In an exemplary embodiment, each hole 29 has a diameter of about 0.05 inch. In exemplary embodiments, about ten to about one hundred holes 29 are provided in each longitudinal vent 22, though fewer or more holes can be used.

Figure 7:
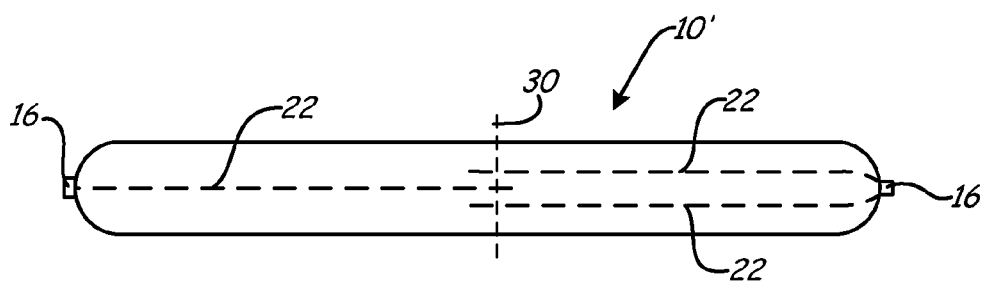
FIG. 7 is a side elevation view of an elongated pressure vessel incorporating exemplary arrangements of longitudinal vents.

In an exemplary embodiment, as illustrated by FIG. 7, longitudinal vent 22 extends from at least the boss 16 to a point in the cylindrical portion 30 of the cylindrical vessel 10'. The cylindrical portion 30 is typically the most compliant (i.e., same strength; but less edge support) portion of the vessel and is thus the most likely area to exhibit bulging or buckling of the vessel liner 20 inwardly because of gas buildup. On any particular vessel, only one longitudinal vent 22 may be required, such as shown in the left half of FIG. 7. Multiple longitudinal vents 22 may also be provided, however, such as shown in the right half of FIG. 7. In one exemplary embodiment, a plurality of longitudinal vents 22 are directed to the boss 16 on one end 14 of vessel 10' and a plurality of longitudinal vents 22 are directed to the boss 16 on the opposite end 14 of vessel 10'. The two sets of longitudinal vents 22 are alternately arranged around the circumference of vessel 10' so that along the cylindrical portion 30 (for example, in one embodiment, adjacent the center of the cylindrical portion 30 of the vessel 10'), two adjacent longitudinal vents are directed to opposite ends 14 of vessel 10'. In yet another embodiment, a single longitudinal vent extends from one boss to the opposite boss. One advantage of using a plurality of discrete longitudinal vents rather than a more extensive venting layer is that the disclosed strips require less material and do not require changes to the process for winding the composite material over liner 20.

Although the subject of this disclosure has been described with reference to several embodiments, workers skilled in the art will recognize that changes may be made in form and detail without departing from the spirit and scope of the disclosure. In addition, any feature disclosed with respect to one embodiment may be incorporated in another embodiment, and vice-versa.

What is claimed is:

1. A pressure vessel having a first end with a first boss and the vessel having a cylindrical portion, the vessel comprising:
    a liner;
    a composite shell disposed over the liner;
    a first longitudinal vent disposed between the liner and the composite shell, the first longitudinal vent comprising an elongated vent defining element, the first longitudinal vent extending at least from the cylindrical portion to the first boss; and
    a tape disposed between the vent defining element and the composite shell.

2. The pressure vessel of claim 1 wherein the vent defining element is fluid permeable.

3. The pressure vessel of claim 1 further comprising an adhesive layer disposed on the tape.

4. The pressure vessel of claim 1 wherein the tape comprises a plurality of holes.

5. The pressure vessel of claim 1 further comprising an adhesive layer disposed on the vent defining element.

6. The pressure vessel of claim 1 wherein an end of the first longitudinal vent is disposed along an outer surface of a neck of the first boss.

7. The pressure vessel of claim 6 wherein the end is open to the atmosphere.

8. A pressure vessel having a first end with a first boss and having a second end with a second boss, the vessel having a cylindrical portion, the vessel comprising:
    a liner;
    a composite shell disposed over the liner;
    a plurality of first longitudinal vents disposed between the liner and the composite shell, each first longitudinal vent comprising a first elongated vent defining element, each first longitudinal vent extending at least from the cylindrical portion to the first boss; and a plurality of second longitudinal vents disposed between the liner and the composite shell, each second longitudinal vent comprising a second elongated vent defining element, each second longitudinal vent extending at least from the cylindrical portion to the second boss;

wherein each of the plurality of first longitudinal vents is circumferentially offset around the cylindrical portion of the vessel from each of the plurality of second longitudinal vents.

9. The pressure vessel of claim 8 wherein an end of at least one of the first and second longitudinal vents is disposed along an outer surface of a neck of the first or second boss.

10. The pressure vessel of claim 9 wherein the end is open to the atmosphere.

11. The pressure vessel of claim 8 wherein at least one of the first and second vent defining elements is fluid permeable.

* * * * *